United States Patent
Waksman

[15] 3,654,966
[45] Apr. 11, 1972

[54] JACKETED FIBROUS DUCT

[72] Inventor: David Waksman, Roeland Park, Kans.

[73] Assignee: Certain-Feed Saint Gobain Insulation Corporation, North Bala Cynwyd, Pa.

[22] Filed: Jan. 26, 1970

[21] Appl. No.: 5,537

[52] U.S. Cl. .................................... 138/141, 138/DIG. 2
[51] Int. Cl. ........................................................ F16l 9/14
[58] Field of Search ................................................ 156/218, 138/137–171 DIG. 2

[56] References Cited

UNITED STATES PATENTS

| | | | |
|---|---|---|---|
| 3,092,529 | 6/1963 | Pearson | 138/DIG. 2 |
| 3,078,880 | 2/1963 | Stephens | 138/DIG. 2 |
| 3,175,586 | 3/1965 | Tatsch | 138/137 |
| 3,406,724 | 10/1968 | Carlstrom et al. | 138/137 |

Primary Examiner—Houston S. Bell, Jr.
Attorney—Synnestvedt and Lechner

[57] ABSTRACT

A duct comprising a tubular body of glass fibers and a surrounding jacket formed of laminated sheet material of which the inner layer comprises a substantially vapor impervious heat sealable thermoplastic resin and of which the outer layer is formed of sheet material, contributing strength to the joint and which is also substantially vapor impervious, the opposite edges of the sheet laminate being brought together around the tubular body and having the thermoplastic resin layers of said opposite edges heat sealed together. A method for applying the jacket is also disclosed, comprising heat sealing edge portions of the jacket together to form a slack loop larger than the perimeter of the duct body, assembling the loop and duct body and thereafter tightening the slack loop on the body by a further heat sealing operation.

8 Claims, 8 Drawing Figures

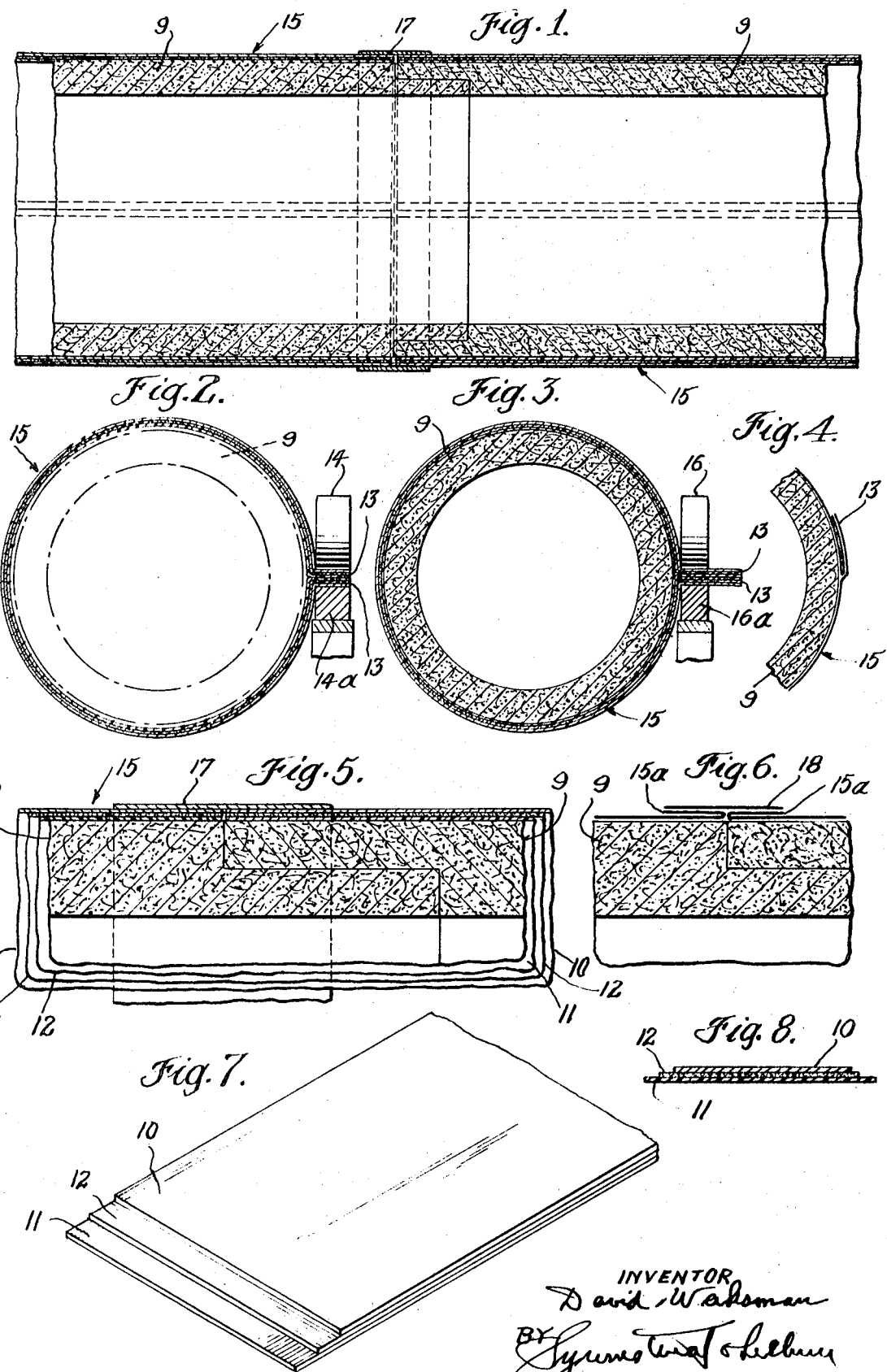

JACKETED FIBROUS DUCT

This invention relates to ducts or insulating sleeves formed of fibrous material, and is especially concerned with a jacketed duct adapted for use in air flow lines such as air conditioning duct lines.

It has been known heretofore to provide fibrous sleeves formed of the general type referred to above in which the duct jacket consists of a relatively heavy gauge aluminum foil, or of a layer or sheet of resin material of substantial thickness. These prior art jacketed ducts are subject to a number of disadvantages. In the case of a jacket consisting of aluminum foil, even if the foil is of relatively great thickness, the jacket is readily subject to being punctured or otherwise damaged. Jackets made of a sheet of resin of substantial thickness are relatively expensive, thereby tending to unnecessarily limit use of ducts of this type.

It is the principal object of the present invention to provide a duct of the kind referred to having a greatly improved jacket. In the preferred embodiment, the jacket utilized for the duct of the present invention is formed as a sheet laminate incorporating several layers of different materials each of which is selected to contribute certain special properties or functions.

Thus, in the jacket used according to the present invention, at least two layers are laminated together, the innermost comprising a thin layer of substantially vapor impervious heat sealable thermoplastic resin material, and the outermost comprising a sheet type material which contributes strength and is preferably also vapor impervious. In this way, both the inner layer and the outer layer contribute to the impermeability of the jacket, and even in the event of use of inner and outer layers both of which are relatively thin, damage to the outer layer will not necessarily cause a vapor leak.

In the preferred embodiment of the invention, moreover, it is still further contemplated to introduce a third component or layer in the jacket laminate, namely a layer of glass fibers introduced between the inner thermoplastic resin layer and the outer sheet layer. In this preferred embodiment, the invention still further achieves additional advantages, notably greatly increased strength of the jacket considered as a whole, so that it is much less subject to being punctured or damaged even where the outermost layer is formed of very thin sheet material, for instance an aluminum foil only a fraction of the thickness of aluminum foil jackets heretofore employed.

Another object of the invention is to provide a jacket which is much less subject to disfigurement as a result of indentations or other damage occurring to the outer surface of the jacket, when compared with the prior art jacket of aluminum foil. This is accomplished by employing an embossed or textured aluminum foil, instead of the smooth surfaced aluminum foil heretofore used.

Still another object of the invention is to provide an improved method for applying a jacket of the kind employed in accordance with the present invention. As will further appear, the method of the present invention provides a simple technique for utilizing flat sheet type material to form the jacket, while at the same time ensuring that the jacket is vapor tight at the longitudinal joint where the edges of the sheet material are brought together around the duct.

How the foregoing objects and advantages are attained, together with others which will occur to those skilled in the art will be clear from the following description referring to the accompanying drawing illustrating a preferred embodiment of the jacketed duct and also illustrating a preferred technique for applying the jacket to the duct.

FIG. 1 is a longitudinal or axial sectional view through two duct sections in end-to-end relation and illustrating the construction of the duct and its jacket and also a manner of interconnecting duct sections;

FIG. 2 is a transverse sectional view illustrating the formation of a jacket loop of larger diameter than the perimeter of a duct;

FIG. 3 is a view similar to FIG. 2 but illustrating the tightening of the slack loop of the jacket upon the duct;

FIG. 4 is a fragmentary cross-sectional view of a portion of a formed duct, with the overlapped portions of the duct jacket folded against the outer surface of the duct;

FIG. 5 is an enlarged fragmentary sectional view of portions of adjoining duct sections, with adhesives tape applied to seal the joint, and indicating the specific construction of the jacketing material;

FIG. 6 is a fragmentary view similar to FIG. 5 but illustrating an alternative arrangement for joining or sealing the jackets of two interconnected duct sections as will be explained;

FIG. 7 is an isometric somewhat diagrammatic view of a piece of the jacket laminate, with parts broken away to illustrate different layers thereof; and FIG. 8 is an enlarged sectional view through the jacket material, with different section lining indicating different materials employed.

From the drawing it will be seen that the duct comprises a body of fibrous material indicated at 9. Although features of the invention are applicable to ducts of a variety of cross-sectional shapes, the duct here shown is cylindrical and each duct section preferably comprises a one piece tubular body formed of fibrous material, desirably glass fibers which are consolidated by means of a binder so as to provide a shape-retaining body structure. Although the invention is applicable to duct sections having plain ends, the shiplap type of duct ends shown in the drawing constitutes one preferred embodiment.

As best seen in FIGS. 7 and 8, the preferred embodiment of the jacketing material of which the jacket is formed comprises a sheet laminate of which the outermost layer 10 comprises a sheet material, preferably a vapor impervious metal foil, such as aluminum foil. This is shown in greatly exaggerated thickness in FIGS. 7 and 8, in a typical case, the aluminum foil being from about 0.0001 inch to 0.005 inch in thickness.

In the preferred embodiment illustrated, it is assumed that the innermost layer of the laminate indicated at 11 in FIGS. 7 and 8 comprises a layer of heat sealable polyvinyl chloride resin material which may be applied to the other layer or layers as a coating or film of from 0.0001 inch to 0.009 inch in thickness.

The preferred laminate for the jacket material still further includes a layer lying between the metal foil 10 and the resin layer 11, the intermediate layer comprising glass fibers which are preferably bonded together and to the metal foil either by the applied coating of thermoplastic resin material or by an adhesive used to laminate resin and foil films together. This glass fiber layer is diagrammatically indicated in FIGS. 7 and 8 by the reference numeral 12, but it is to be understood that the layer 12 need not even be a layer which is self-supporting without the other layers, but may merely comprise a network of glass fibers either randomly distributed as in various known forms of glass fiber mats, or oriented according to some pattern. A random fiber mat is highly effective for the purpose of the present invention and is very inexpensive.

In applying the jacket to the duct, an appropriate sheet or base of the jacketing material is prepared and the inner resin layers of opposite edges of the sheet are brought together as indicated at 13—13 in FIG. 2. These edges are then welded or heat sealed together as by means of the heater elements such as the heat roller and backing member indicated in FIG. 2 at 14–14a. This sealing operation is preferably performed prior to insertion of the tubular fibrous body of the duct, and the heat seal is so located as to provide a jacket loop indicated at 15. In the preferred practice of the invention the jacket loop 15 is initially a slack loop of greater size than the perimeter of the tubular fibrous duct body, as is indicated in FIG. 2, in which the tubular body 9 is indicated in dot and dash lines. After forming the seal as shown in FIG. 2, the loop is tightened about the tubular body and an additional heat seal operation is effected in order to remove the slack from the loop and maintain the jacket in close or snug engagement with the tubular body. This additional heat sealing operation is indicated in FIG. 3 where the heated sealing elements such as roller and backing member 16–16a are shown.

By effecting the sealing operation in the two stages described above, the initial seal (formed by elements 14—14 may readily be made completely vapor tight, and this seal will remain effective to ensure that the jacket is vapor impervious, even if the subsequent sealing (effected by the elements 16–16/a do not provide a completely vapor tight joint. The seal provided by the elements 16–16a thus need only serve the function of tightening the jacket upon the tubular body and maintaining the snug engagement of the jacket with the body.

In FIG. 4 the tab comprising the sealed edges of the jacket material is shown as being folded against the outer surface of the tubular body 19. This tab, if desired, may be fastened in this position adhesively. Also the tab may, if desired, be utilized in a radially projecting position as a means or hanger for supporting the duct.

When duct sections formed according to the present invention are brought together, for instance as shown in FIG. 1, a joint between the jackets of the adjacent ends of the ducts may be interconnected and sealed by applying an adhesive tape 17. In an alternative embodiment, shown in FIG. 6, a joint may be made by providing a jacket projecting beyond the end of the duct section and then folding the end portion outwardly and back over the end of the duct as indicated at 15a in FIG. 6, after which a fastening strip or tape may be applied as indicated at 18 and this may be heat sealed with the resin layer of the jacket material which, because of the folding indicated, will now be presented outwardly.

Although it is preferred to perform a loop of the material in the manner described above, it should be understood that the particular type of jacket material herein disclosed is of advantage regardless of the specific technique employed for application of the jacket to the duct body. The jacket material may even be applied after installation of tubular duct body pieces, in cases where the duct is readily accessible and where the heat sealing operation can be performed in situ.

Regardless of the method of applying the jacket, a continuous piece of the jacket laminate may be applied to and extended over several sections of the duct, thereby eliminating some of the tape joints.

With further reference to the construction of the jacket material or laminate, it is important that the innermost layer comprise a heat sealable resin material capable of providing a vapor barrier seal, preferably a heat sealable resin material at least in part consisting of polyvinyl chloride resin, although certain resin mixtures and copolymers are effectively used, for instance the copolymer comprising vinyl chloride and vinylidene chloride resin constituents.

The outermost layer can be formed of a variety of sheet materials, preferably sheet materials which have some appreciable strength and are substantially vapor impervious. The outer layer preferably is not softenable or thermoplastic at the temperatures used for heat sealing the inner layer. Certain papers such as Kraft paper can be used, but it is preferred to employ metal foil, most desirably aluminum foil, and in using aluminum foil it is desirable to utilize a form of foil which is somewhat embossed or textured so that indentations or scratches will not be noticeable.

Although, as above indicated, it is preferred to interpose a layer of glass fibers between the inner resin layer of the laminate and the outer sheet material thereof, it is also possible to incorporate glass fibers in the outer layer and, indeed, the outer layer may even be formed of glass fibers, for instance the outer layer may comprise a woven glass fiber cloth, which would provide a laminate with a very high puncture resistance. The use of a triple layer laminate for the jacket, embodying polyvinyl chloride resin or a vinyl chloride-vinylidene chloride copolymer resin in the inner layer, aluminum foil in the outer layer and glass fibers interposed therebetween, constitutes the preferred embodiment for the jacket material because this jacket material achieves an important combination of properties, while at the same time providing low cost. Such a jacket material is stronger than most jackets employed for this purpose, is much more puncture proof, and is substantially completely vapor impervious.

I claim:

1. A duct comprising a tubular body of glass fibers and a jacket surrounding the tubular body and formed of a sheet laminate with opposite edges brought together around the tubular body and comprising an inner layer lying against said tubular body and formed of a heat sealable thermoplastic resin and an outer layer of vapor impervious material, the sheet laminate snugly fitting the outside of the tubular body and having the thermoplastic resin layer of the opposite edge portions thereof lying against each other and heat sealed to each other.

2. A duct as defined in claim 1 in which the sheet laminate comprises glass fibers.

3. A duct as defined in claim 2 in which the glass fibers of the laminate are interposed as another layer of the laminate between the inner resin layer and the outer vapor impervious layer.

4. A duct as defined in claim 2 in which the glass fibers of the laminate are incorporated in the outer vapor impervious layer.

5. A duct comprising a tubular body of glass fibers and a jacket surrounding the tubular body and formed of a sheet laminate with opposite edges brought together around the tubular body and comprising an inner layer lying against said tubular body and formed of a heat sealable thermoplastic resin, an outer layer of vapor impervious metal foil, and glass fibers between the inner and outer layers, the sheet laminate snugly fitting the outside of the tubular body and having the thermoplastic resin layer of the opposite edge portions thereof lying against each other and heat sealed to each other.

6. A duct as defined in claim 5 in which the heat sealable thermoplastic resin comprises polyvinyl chloride resin material.

7. A duct as defined in claim 5 in which the heat sealable thermoplastic resin comprises a copolymer of vinyl chloride and vinylidene chloride.

8. A duct comprising a tubular body of glass fibers and a jacket surrounding the tubular body and formed of a sheet laminate with opposite edges brought together around the tubular body and comprising an inner layer lying against said tubular body and formed of a substantially vapor impervious heat sealable thermoplastic resin, an outer layer of substantially vapor impervious non-thermoplastic material, and glass fibers between the inner and outer layers, the sheet laminate snugly fitting the outside of the tubular body and having the thermoplastic resin layer of the opposite edge portions thereof lying against each other and heat sealed to each other.

* * * * *